United States Patent [19]
Reilly, III

[11] Patent Number: 5,782,005
[45] Date of Patent: Jul. 21, 1998

[54] GOLF CLUB FITTING METHOD

[76] Inventor: Earl F. Reilly, III, 576-26th Ave., Longview, Wash. 98632

[21] Appl. No.: 789,644

[22] Filed: Jan. 27, 1997

Related U.S. Application Data

[63] Continuation of Ser. No. 619,855, Mar. 20, 1996.
[51] Int. Cl.$^6$ ............................................. A63B 57/00
[52] U.S. Cl. ................................................ 33/508
[58] Field of Search .......................... 33/508; 473/331, 473/238, 242, 244, 246, 247, 248, 251, 252, 253, 254

[56] References Cited

U.S. PATENT DOCUMENTS

| | | | |
|---|---|---|---|
| 3,953,033 | 4/1976 | Kelly et al. .............................. | 33/508 |
| 4,736,951 | 4/1988 | Grant ...................................... | 473/246 |
| 4,885,847 | 12/1989 | Korfanta ................................ | 33/508 |
| 5,390,919 | 2/1995 | Stubbs et al. ......................... | 473/246 |
| 5,469,627 | 11/1995 | Denny et al. ......................... | 33/508 |
| 5,533,730 | 7/1996 | Ruvang ................................. | 473/251 |

*Primary Examiner*—Thomas B. Will

[57] ABSTRACT

A method and apparatus for fitting individual golfers for golf putters provides for determining the balanced position of the putter shaft relative to the putter head. The proper angle of the putter shaft relative to the putter head horizontal axis is measured for the particular golfer, and this measured angle is utilized to determine the point of attachment of the putter shaft on the horizontal axis of the putter head. The determined values are then employed to manufacture a "face balanced" putter for that particular golfer.

5 Claims, 4 Drawing Sheets

GOLF CLUB FITTING METHOD

This application is a continuation of application Ser. No. 08/619,855, filed Mar. 20, 1996 pending.

BACKGROUND OF THE INVENTION

1. Field of the Invention

This invention relates in general to golf club putter fitting methods and equipment, and relates in particular to such methods and equipment which provide for fitting of a golf club putter to each individual for the optimum adjustment of both the location on the horizontal axis of the putter head at which the putter shaft is effectively joined thereto and the angle at which the putter shaft meets the putter head to provide the ideal balance to the putter.

2. Description of the Prior Art

There has been extensive activity over the years in attempting to develop golf club products which optimize the effectiveness of the clubs' performance for the average golfer. The majority of this effort has been directed to the design of "fairway" golf clubs, i.e., woods and irons, and relatively little emphasis has been given to the design of putters. Considering that putters account for approximately half of the strokes in an average golfer's performance, it is appropriate that increased attention be paid to optimizing putter design and personalizing such design to each individual golfer's needs.

Among the prior art patents relating to golf club design are the following:

U.S. Pat. No. 4,736,951, Grant, is directed to a golf club which provides for adjustment of the club shaft length, the angle or loft of the club face relative to the club shaft, the position of the putter head horizontally relative to the point of attachment of the putter shaft to the putter head, and the angle of the club shaft relative to the horizontal axis of the club head.

U.S. Pat. No. 4,506,888, Nardozzi, shows a golf putter in which the horizontal position of the putter head relative to the putter shaft is adjustable by means of a guideway in the top of the putter head which engages a mating shoulder on the lower end of the putter shaft.

SUMMARY OF THE INVENTION

In accordance with this invention, a putter fitting system is provided which can be used to determine the optimum value of parameters of the putter for each individual golfer being fitted, and these determined values can be transferred to a permanent putter which is fabricated on the basis of these determined values.

In a first step in the present process, an individual to be fitted holds a fitting putter member including a putter shaft, a putter head and an adjustable hosel member connecting the shaft to the putter head, the hosel member having two components which are movable relative to each other. The individual holds the shaft of the fitting putter member in their normal putting grip and stance, with the putter head adjustably attached to the hosel member at approximately the center of the putter head along its longitudinal axis. This position results in approximately an even distribution of the putter head weight along the putter head longitudinal axis on each side of the point of attachment of the hosel member to the putter head. With the golfer still gripping the fitting member shaft, the angle between a vertical line through the center of the putter head and the axial axis of the shaft is adjusted to provide the optimum fit for the particular golfer's putting stance. Once determined, this optimum angle is temporarily fastened by clamping together the adjustable components of the hosel member.

Following this, the determined optimum angle between the putter shaft axis and the vertical axis of the putter head is utilized to establish the proper point for permanently attaching the putter head to the hosel member and shaft. This produces a "face balanced" putter head which results in an optimum mechanical structure for imparting maximum accuracy to a resulting putt. After the fitting process is completed, the determined values of the shaft/putter head angle and the attachment point of the hosel member to the putter head are transferred to the fabrication of a permanent putter for that golfer. The fitting components used therein may then be reused in subsequent fittings for other golfers.

DESCRIPTION OF THE PREFERRED EMBODIMENT

Figure 1:
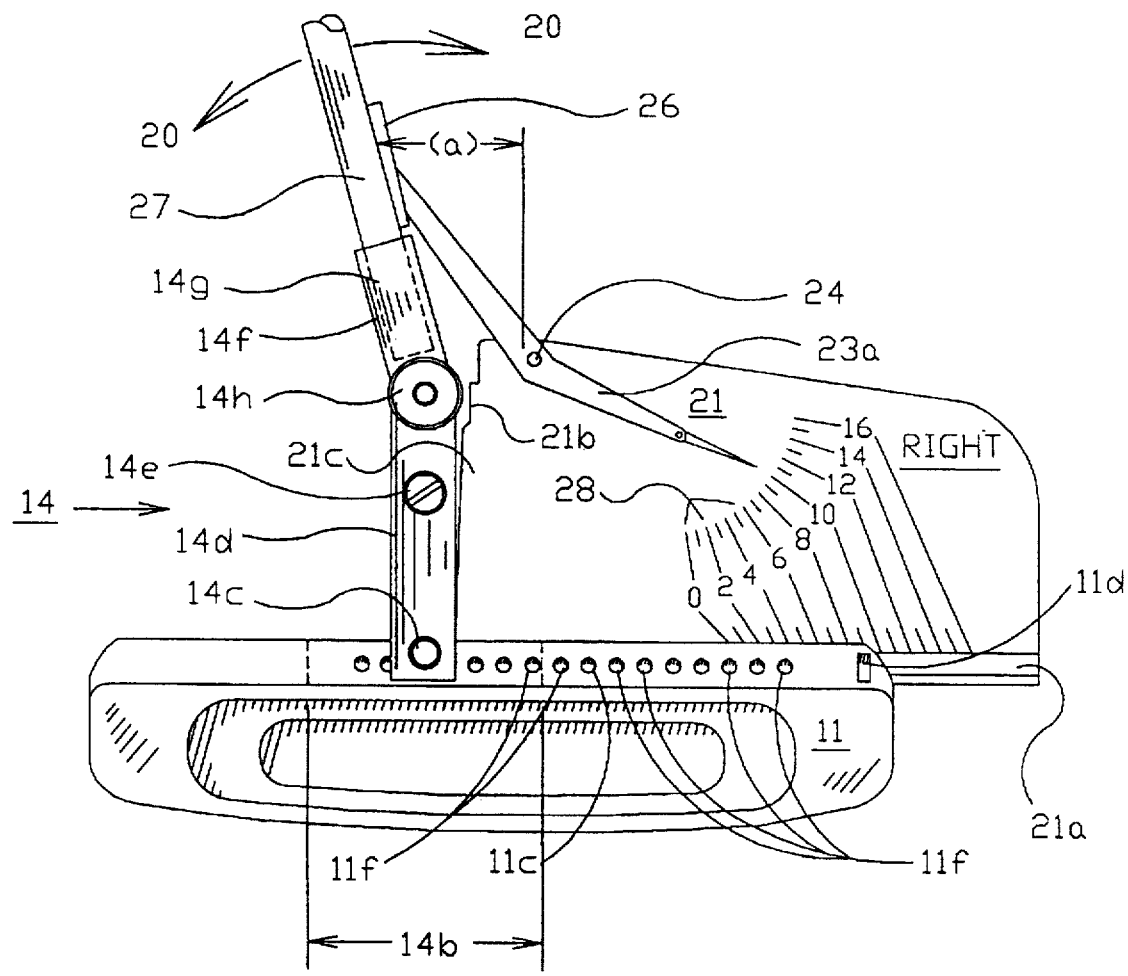
FIG. 1 is a side view illustrating the components used in the fitting system of the present invention.
Figure 2:
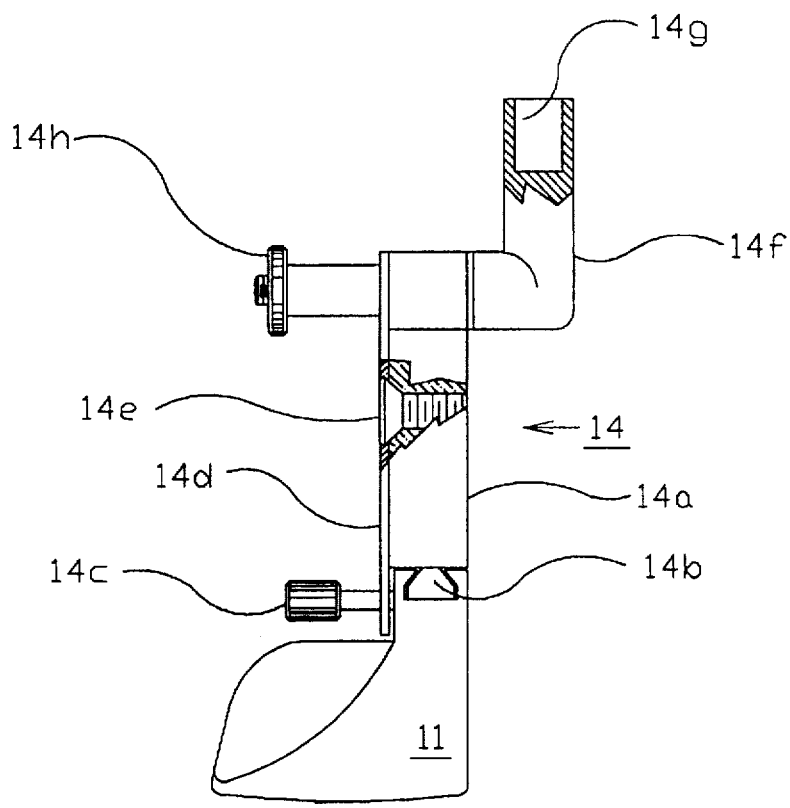
FIG. 2 a front view showing the fitting putter head and the attachment of the adjustable hosel member thereto.
Figure 3:
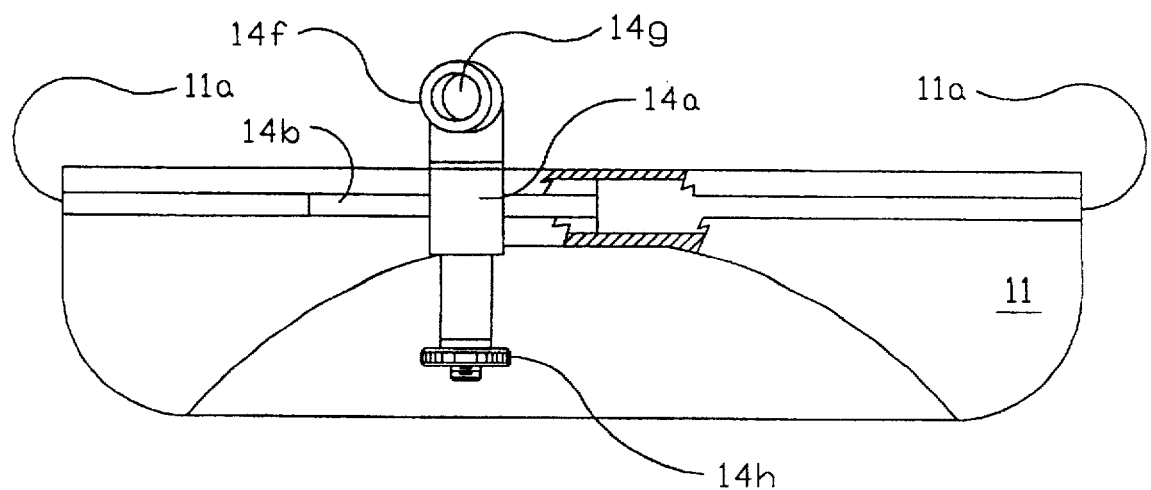
FIG. 3 is a top view showing additional details of the putter head and hosel member.

Referring to FIGS. 1–3, the fitting system of this invention includes a fitting putter head 11 and a hosel member 14 having a lower hosel member 14a and an upper hosel member 14f. Upper member 14f is rotatable about the vertical axis of lower member 14a around a fitting and adjustable nut 14h and associated screw (FIG. 2) which extends through members 14a, 14f. The system also includes a fitting shaft 27 which engages the upper end of upper hosel member 14f and is gripped by the golfer to be fitted. The system further includes a fitting plate 21 which is engagable with putter head 11 and can be moved along the horizontal axis thereof during fitting.

An indicator arm 23a movable with a vane 26 around a pivot shaft 24 moves across a graduated scale 28 on plate 21, and the position on scale 28 of the tip of arm 23a when vane 26 is resting against shaft 27 (FIG. 1) provides a measure of the proper slope of shaft 27 relative to the vertical axis of putter head 11. The reading on scale 28 then provides an indication of the amount of the angle (a) to be incorporated into the finished putter. This indication is used in conjunction with an index mark 11d on the side of putter head 11 to determine the proper point for attaching hosel member 14 to putter head 11, as will be described in more detail below.

Putter head 11 has a keyed slot 11a extending along the length thereof for slidably receiving a key 14b (FIGS. 2 and 3) on the bottom of lower member hosel member 14a. Initially, key 14b (and hosel 14) are positioned in keyed slot 11a so that the vertical axis of hosel member 14a is located at a midpoint 11c along the length of putter head 11. Upper hosel member 14f can rotate relative to lower hosel head member 14a around an adjustable fitting nut and shaft 14h to vary the angle (a) (shown in FIG. 1) between a vertical line and the axis along the length of shaft 27. This rotation (indicated by arrows 20 in FIG. 1) occurs around an axis extending through the upper end of lower hosel member 14a and the lower end of upper hosel member 14f.

Shaft 27 is gripped by the golfer to be fitted and the shaft and putter head 11 are placed in the normal stance of putting for that golfer, including adjustment of angle (a). When the desired shaft-to hosel angle for that golfer is established, fitting nut 14h is tightened to firmly clamp upper hosel member 14f and shaft 27 in the selected angular position relative to lower hosel member 14a.

Figures 4, 5:
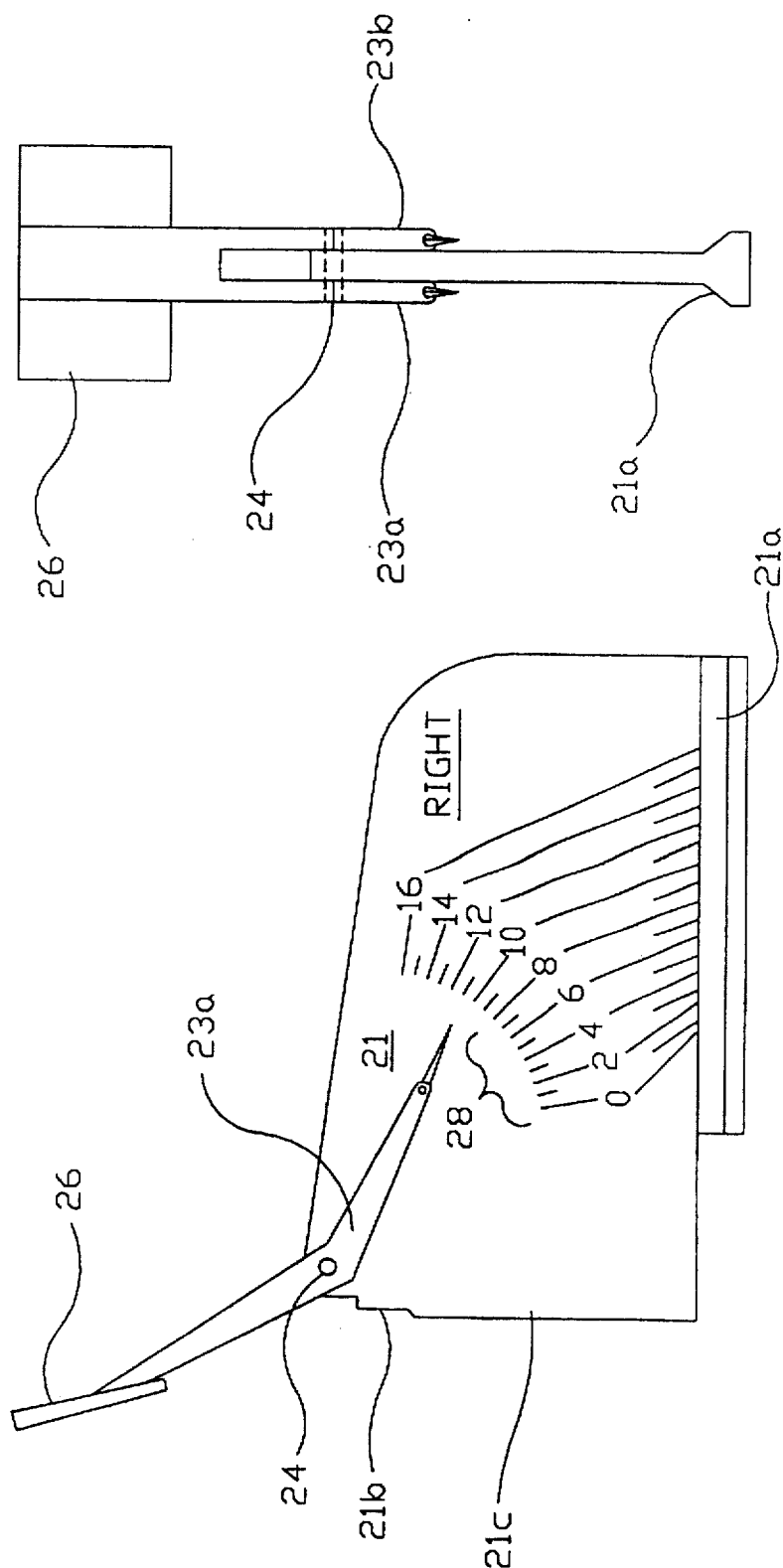
FIG. 4 is a side view of the fitting plate used in the invention.
FIG. 5 As a front view of the fitting plate.
Figure 6:
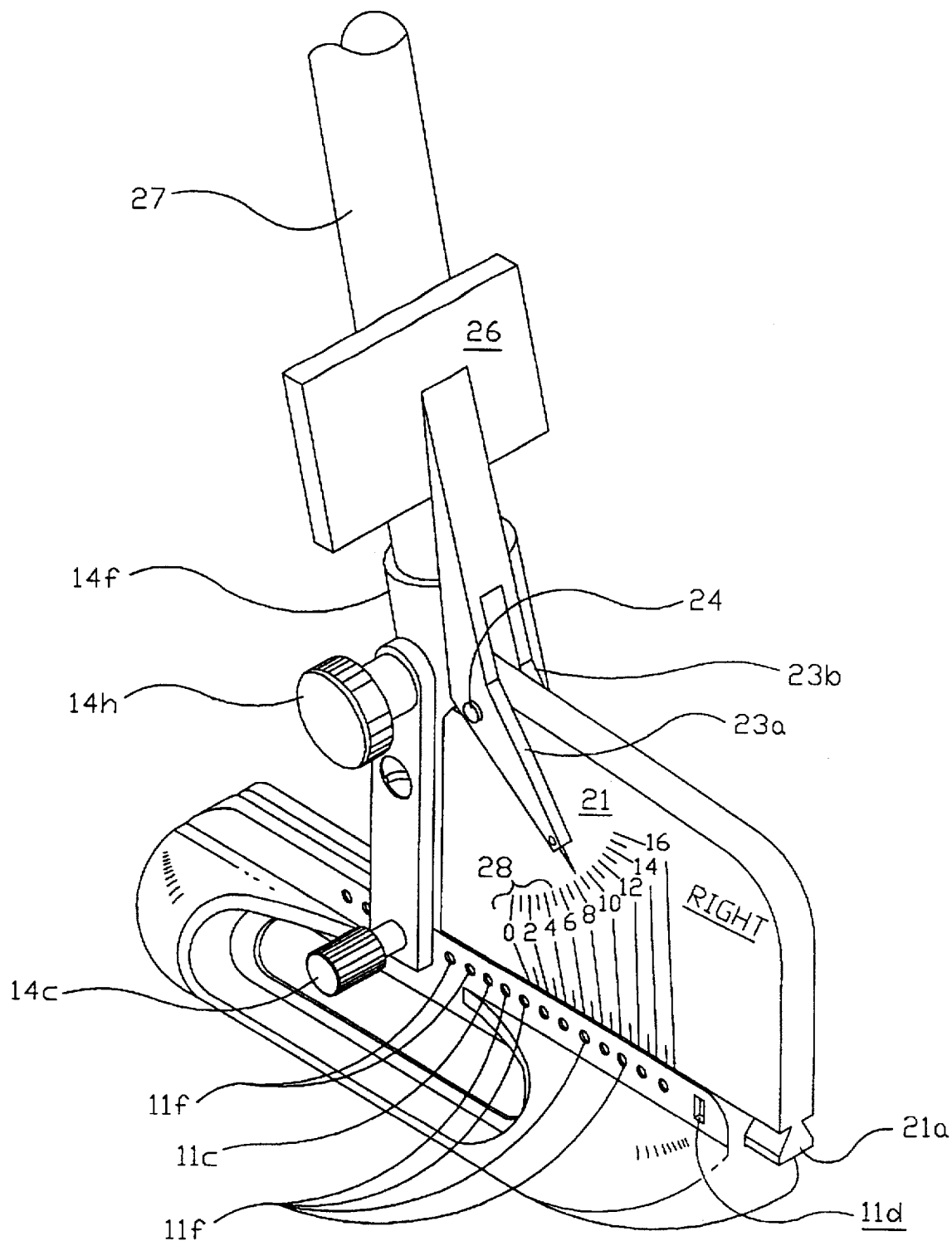
FIG. 6 is an isometric view of the components of the fitting system.

Next, angle measuring plate 21 (FIGS. 1, 4 and 6) having a key 21a on a portion of the bottom thereof is inserted into putter head keyed slot 11a. Plate 21 carries a pair of movable indicator arm 23a, 23b (FIGS. 5 and 6) which are pivotally attached to plate 21 by fastening means 24. As described above, the upper ends of arms 23a and 23b carry vane member 26 which can be adjusted by the fitter to bear against golf shaft 27. Plate 21 has a stepped region 21b (FIGS. 1 and 4) to permit at least a portion of plate end surface 21c to bear against the vertical portion of lower hosel member 14a. The angle (a) of shaft 27 relative to the vertical is transmitted by vane 26 through movement of arms 23a, 23b to the graduated scale markings 28 on both faces of plate 21.

Key 21a and plate 21 slide in key slot 11a in putter head 11 and are pushed against key 14b to urge key 14b, hosel members 14a, 14f and shaft 27 (to the left in FIG. 1) until the upper end of vane 26 bears against shaft 27. Shaft 27 and upper hosel member 14f had previously been locked in angular position relative to lower hosel member 14a by nut 14h after adjusting the angle (a) to the individual's putting stance. This horizontal movement of plate 21, key 14b, hosel members 14a, 14f and shaft 27 continues until the measured angle on scale 28, determined as described above, is aligned with mark 11d on the face of putter head 11.

After achieving the face balanced position of the putter head, a screw 14c mounted in a spring steel member 14d on the side of lower hosel member 14a is tightened into one of the recesses 11f spaced along the horizontal axis of putter head 11, to lock key 14b and putter head 11 together for the rest of the fitting operation. Spring steel member 14d is secured to hosel member 14a by a fastener 14e.

If, based on an individual golfer's preference, it is desired to add additional weight to the putter head after the above described fitting and balancing operations, this may be accomplished by adding increments of weight to the top of lower hosel member 14a until the putter has the appropriate "feel" for that golfer. This added amount of weight may then be added to the hosel of the finished putter. If it is desired to provide for adjustment of the length of the putter shaft for different golfer's height and putting stance, this may be accomplished, for example, in the manner shown in the above described U.S. Pat. No. 4,736,951, in which the measured shaft length may be varied to provide the desired fit.

The embodiment illustrated in the drawings shows how the present invention may be used with right-handed golfers, as indicated by the legend shown on one side of plate 21. For left-handed golfers, the same fitting equipment may be employed, utilizing indicator arm 23b and a scale similar to scale 28 on the reverse side of plate 21, with an indication on that side of plate 21 that that side is for use with left-handed golfers. In the case of left-handed golfers, plate 21 and key 21a are inserted into key slot 11a from left to right so that vane 26 bears against shaft 27 as it is held by a left-handed golfer in a putting stance.

Although the invention has been illustrated with a particular configuration of putter head, it will be understood that other configurations of putter heads may be employed with equal effectiveness. The important requirement is that the fitting equipment employed provide for horizontal positioning of the putter head relative to the putter shaft, and for adjusting the angle of the putter shaft relative to a vertical axis through the putter head.

I claim:

1. A method for fitting a golf putter club to an individual golfer, said method employing a fitting shaft member and a fitting putter head, the fitting putter head having a substantially horizontal axis, the position of said fitting shaft member, and said fitting putter head being adjustable relative to each other, said method comprising the steps of:
        adjusting the angle of said fitting shaft member relative to said horizontal axis of said fitting putter head to fit the putting stance of the golfer being fitted; and
        adjusting the location of attachment of said fitting shaft member along said horizontal axis of said fitting putter head based on said adjusted angle, to thereby achieve a face balanced condition for said putter club for said golfer being fitted.

2. A method in accordance with claim 1 in which said fitting putter head includes a reference mark on one end thereof, said method including the step of utilizing said reference mark on said putter head and a measure of said adjusted angle to determine the location of attachment of said fitting shaft member to said horizontal axis of said fitting putter head.

3. A method in accordance with claim 1 in which said angle of said fitting shaft member relative to said fitting putter head is separately adjustable for both right handed and left handed golfers.

4. A method in accordance with claim 1 in which the angle of the attachment of said fitting putter shaft relative to said fitting putter head is adjusted with said fitting putter shaft located at the center of gravity of said fitting putter head.

5. A method in accordance with claim 1 including the step of adding weight to said fitting putter head to increase the weight of said putter club.

\* \* \* \* \*